United States Patent
Kari et al.

(10) Patent No.: US 8,840,521 B2
(45) Date of Patent: Sep. 23, 2014

(54) GEAR TRAIN FOR A WIND TURBINE

(75) Inventors: Alexander Kari, Fuschl am See (AT);
Christian Forstner, Gmunden (AT)

(73) Assignee: Miba Gleitlager GmbH, Laakirchen (AT)

( * ) Notice: Subject to any disclaimer, the term of this patent is extended or adjusted under 35 U.S.C. 154(b) by 0 days.

(21) Appl. No.: 13/639,625

(22) PCT Filed: Apr. 14, 2011

(86) PCT No.: PCT/AT2011/000181
§ 371 (c)(1),
(2), (4) Date: Oct. 5, 2012

(87) PCT Pub. No.: WO2011/127509
PCT Pub. Date: Oct. 20, 2011

(65) Prior Publication Data
US 2013/0053210 A1    Feb. 28, 2013

(30) Foreign Application Priority Data

Apr. 14, 2010 (AT) ............................ A 598/2010

(51) Int. Cl.
| F16H 57/08 | (2006.01) |
| F16H 57/04 | (2010.01) |
| F16C 33/20 | (2006.01) |
| F16C 41/00 | (2006.01) |

(52) U.S. Cl.
CPC ........ *F16H 57/041* (2013.01); *F16H 2057/085* (2013.01); *F16C 2361/61* (2013.01); *F16H 57/0479* (2013.01); *F16C 33/203* (2013.01); *F16C 41/008* (2013.01); *F16C 33/20* (2013.01); *F05B 2260/40311* (2013.01)
USPC .......................................................... 475/331

(58) Field of Classification Search
USPC .......................................................... 475/348
See application file for complete search history.

(56) References Cited

U.S. PATENT DOCUMENTS

| 4,325,589 | A  |   | 4/1982  | Hirt |
| 4,394,091 | A  | * | 7/1983  | Klomp ........................ 384/101 |
| 6,929,402 | B1 | * | 8/2005  | Titus ............................ 384/107 |
| 7,011,598 | B2 | * | 3/2006  | Flamang et al. .............. 475/331 |
| 7,252,615 | B2 | * | 8/2007  | Kempf ......................... 475/159 |
| 7,829,201 | B2 | * | 11/2010 | Zidar et al. .................. 428/658 |
| 8,075,190 | B1 | * | 12/2011 | Wadehn et al. .............. 384/108 |
| 8,172,531 | B2 | * | 5/2012  | Wadehn ........................ 416/27 |
| 8,287,423 | B2 | * | 10/2012 | Lopez et al. ................. 475/347 |
| 8,414,448 | B2 | * | 4/2013  | Madge et al. ................ 475/348 |

(Continued)

FOREIGN PATENT DOCUMENTS

| CN | 101581284 | 11/2009 |
| DE | 102 60 132 | 7/2004 |

(Continued)

OTHER PUBLICATIONS

Thörnblad P., "Gears for Wind Power Plants," Second International Symposium on Wind Energy Systems, 1978, pp. C6-89 to C6-106. XP-002133564 (ISR).

(Continued)

*Primary Examiner* — Saul Rodriguez
*Assistant Examiner* — David J Hlavka
(74) *Attorney, Agent, or Firm* — Collard & Roe, P.C.

(57) ABSTRACT

The invention relates to a gear train (1), in particular a planetary gear train, for a wind turbine comprising a plurality of gears, in particular planet gears (4), which are each supported on a shaft (8) by means of a bearing element, wherein the bearing element is a multi-layer plain bearing (7).

9 Claims, 2 Drawing Sheets

(56) References Cited

U.S. PATENT DOCUMENTS

| | | | |
|---|---|---|---|
| 8,425,361 B1* | 4/2013 | Beckner et al. | 475/159 |
| 8,636,615 B2* | 1/2014 | Suzuki et al. | 475/159 |
| 2002/0131657 A1 | 9/2002 | Inoue et al. | |
| 2004/0038770 A1* | 2/2004 | Flamang et al. | 475/348 |
| 2006/0205561 A1* | 9/2006 | Flamang et al. | 475/348 |
| 2007/0065067 A1 | 3/2007 | Gartner et al. | |
| 2007/0269147 A1 | 11/2007 | Rumpf | |
| 2008/0152942 A1* | 6/2008 | Zidar et al. | 428/615 |
| 2010/0303626 A1* | 12/2010 | Mostafi | 416/170 R |

FOREIGN PATENT DOCUMENTS

| | | |
|---|---|---|
| DE | 103 18 945 | 10/2004 |
| EP | 0 743 472 | 11/1996 |
| EP | 1 353 082 | 10/2003 |
| EP | 1 544 504 | 6/2005 |
| EP | 1 764 522 | 3/2007 |
| EP | 1 840 394 | 10/2007 |
| EP | 1 933 048 | 6/2008 |
| JP | 2004 025760 | 1/2004 |

OTHER PUBLICATIONS

International Search Report of PCT/AT2011/000181, date of mailing Jul. 25, 2011.

Wikipedia, Fluid bearing, http://en.wikipedia.org/wiki/Fluid_bearing, downloaded Jun. 26, 2014 (8 pages).

* cited by examiner

GEAR TRAIN FOR A WIND TURBINE

CROSS REFERENCE TO RELATED APPLICATIONS

This application is the National Stage of PCT/AT2011/000181 filed on Apr. 14, 2011, which claims priority under 35 U.S.C. §119 of Austrian Application No. A 598/2010 filed on Apr. 14, 2010, the disclosure of which is incorporated by reference. The international application under PCT article 21(2) was not published in English.

The invention relates to a gear train, in particular a planetary gear, for a wind turbine with a plurality of gear train wheels, in particular planetary gears, which are mounted respectively by a bearing element on a shaft, as well as a wind turbine comprising a rotor and a generator, wherein between the rotor and the generator a gear train, in particular a planetary gear, is arranged which is in operative connection with the rotor and the generator.

Planetary gear trains for wind turbines, as known for example from DE 102 60 132 A1, are used to translate the relatively low speed of the rotor of the wind turbine into a higher speed of the generator rotor. Usually in such planetary gears, as also described in DE 102 60 132 A1, rolling bearings are used as the bearing elements for the planetary gears.

EP 1 544 504 A2 already describes a plain bearing application in the area of planetary gear trains for wind turbines. The rotating part of the planetary gear is thus connected to a rotor and mounted together with the latter in a large bearing arranged on the outer circumference of the ring gear. The large bearing is configured as a plain bearing, a bearing surface of which is formed by the radially outer peripheral surface of the ring gear. In this way it is possible to design the planetary gear to be simpler and less expensive. Between the bearing surfaces and the bearing counter surfaces there is a lubricating gap and hydrostatic lubricating pockets are worked into the bearing surface on the peripheral surface of the ring gear and in the bearing counter surface of the housing opposite the end side of the ring gear. Furthermore, EP 1 544 504 A2 describes that with larger dimensions of the planetary gear connected to the rotor of the wind turbine and the forces and moments of the oil pump circuit acting as a result on the plain bearing only a relatively low static oil pressure needs to be provided in order to achieve a separation of the bearing surfaces and the bearing counter surfaces.

Although the principle use of plain bearings has been described in the prior art for wind turbines, there are still reservations about plain bearing applications in the field. Thus in the prior art the opinion is represented that a hydrostatic system is necessary, at least in the run-in phase, in order to supply oil to the bearing surfaces, taking into account both the amount required and the oil pressure as high specific loads in connection with low antifrictional speeds do not permit a purely hydrodynamic system. In particular, it is assumed that in the area of mixed friction localized increases in temperature occur and there is increased wear, so that purely hydrodynamic plain bearings can hardly be implemented in a planetary gear for wind turbines.

The objective of the present invention is to create a planetary gear with improved operating properties.

Said objective is achieved by means of a gear train of the aforementioned kind in that the bearing element is a multi-layered plain bearing, and by the wind turbine which comprises said gear train and independently thereof also by the use of a multi-layered plain bearing in gear train, in particular a planetary gear, of a wind turbine.

The advantage of the multi-layered design of the plain bearing is that the latter can be adjusted to purely hydrodynamic conditions even during the start-up phase. In this way the structure of the gear train, in particular the planetary gear, can be simplified and thereby also that of the wind turbine, as systems are no longer necessary for maintaining a minimum oil pressure for said bearings. The plain bearing itself can be provided by way of the multi-layered configuration with corresponding fail-safe properties. The bearing itself requires hardly any maintenance and is also not prone to failure.

Preferably, the multi-layered plain bearing is configured as a bearing bush, whereby its arrangement on the (planet) shaft or in the gear wheel can be simplified compared to plain bearing half shells, in particular no adjusting operations are necessary for the alignment of the plain bearing. In particular, this is an advantage for maintenance work in case a plain bearing needs to be replaced, as in this way the downtimes of the wind turbine can be reduced and thus the economic efficiency of such wind turbines can be improved considerably. It is still the case that the failure of the bearings in wind turbines, in particular if the latter are configured as rolling bearings, is a significant cost factor compared to other reasons for the operational failure of the wind turbine because of the long downtimes of the wind turbine. Thus by way of this configuration the operating costs can be reduced considerably not least because of the increase in the lifetime.

The multi-layered plain bearing can consist of or comprise at least one support layer and at least one antifrictional layer, wherein the antifrictional layer has a Vickers hardness of at least 75 HV (0.001), in particular at least 110 HV (0.001), at least in the surface area of a running surface. Furthermore, according to another embodiment variant it is possible that on an inner surface of the bore of the gear train mounting the shaft and/or on an outer surface of the shaft an antifrictional layer is applied, possibly with the arrangement of at least one intermediate layer, wherein said antifrictional layer has a Vickers hardness of at least 75 HV (0.001), in particular at least 110 HV (0.001), at least in the surface area of a running surface. By giving the antifrictional layer a specific minimum hardness, at least in the surface area, wear can be reduced as the factor of the plain bearing that limits its lifetime. Unlike conventional plain bearing systems for wind turbines, in which it is assumed that a soft bearing material has to be used to cope with the mixed friction and the elastic deformation during the operation of the wind turbine, which means suitably large dimensions and hydrodynamic losses, it has been shown that for the application of a multi-layered plain bearing according to the invention it is an advantage if suitably hard surface materials are used. A further advantage is that the plain bearing can be exposed to greater, relative pressure, so that the bearing surface can thus be reduced and the entire gear train can be provided with a smaller, rotating mass, whereby losses can be reduced further. Furthermore, in this way also smaller sizes of the gear train are possible. By directly coating the shaft or the surface of the bore with the antifrictional material also a simpler structure of the plain bearing is achieved, whereby cost savings can also be made and thereby a further reduction of the rotating masses and the size of the gear train can be achieved.

Preferably, the antifrictional layer consists of a material which is selected from a group comprising aluminum-based alloys, bismuth-based alloys, silver-based alloys and antifrictional paints. In particular, these wear-resistant and tribologically particularly effective materials have proved particularly advantageous in compact planetary gears with a high power density and without the use of load-equalizing technologies such as for example the so-called "flexible pin solution".

Surprisingly, also antifrictional paints can be used as the antifrictional layers, although the latter have Vickers hardness of about 25 HV (0.001) to 60 HV (0.001), and are thus significantly softer than the antifrictional layers described above, whereby here an increase in the hardness can be achieved by the addition of suitable hard particles.

It is also possible that a polymer-based run-in layer is arranged on the antifrictional layer in order to achieve better adaptability of the plain bearing running surface to the counter running surface during the running-in of the plain bearing, wherein it is an advantage that said running-in layer also improves the tribology of the plain bearing itself and in addition if said running-in layer is worn away owing to the small particles of the resulting wear the latter does not have a disadvantageous effect on the plain bearing surface or the lubricating oil, in particular if said polymer-based running-in layer has a lower hardness than the antifrictional layer itself.

At least one channel and/or at least one bore can be arranged in the shaft guided by the gear train wheel for supplying and removing a lubricant for the bearing element. By means of specific oil guiding with fresh oil directly into the lubricating gap in the area of the main loading zone and by means of its specific removal a small temperature increase during the operation of the gear train is avoided more effectively despite the high load and mixed friction. By optimizing the throughput of lubricating oil to a minimum—it should also be mentioned that this is a hydrodynamically operated plain bearing without hydrostatic support—supply pressures and amounts of lubricating oil and power losses can be approximated to that of rolling bearing solutions which usually are more advantageous than plain bearing solutions with regard to power losses.

It is also an advantage if the bearing element comprises at least two multi-layered plain bearings arranged spaced apart axially, as thereby on the one hand the bearing of the gear train can be more precise and on the other hand any possible tilting movements can be intercepted more effectively.

For a better understanding of the invention the latter is explained in more detail with reference to the following figures.

In a much simplified representation:

Figure 1:
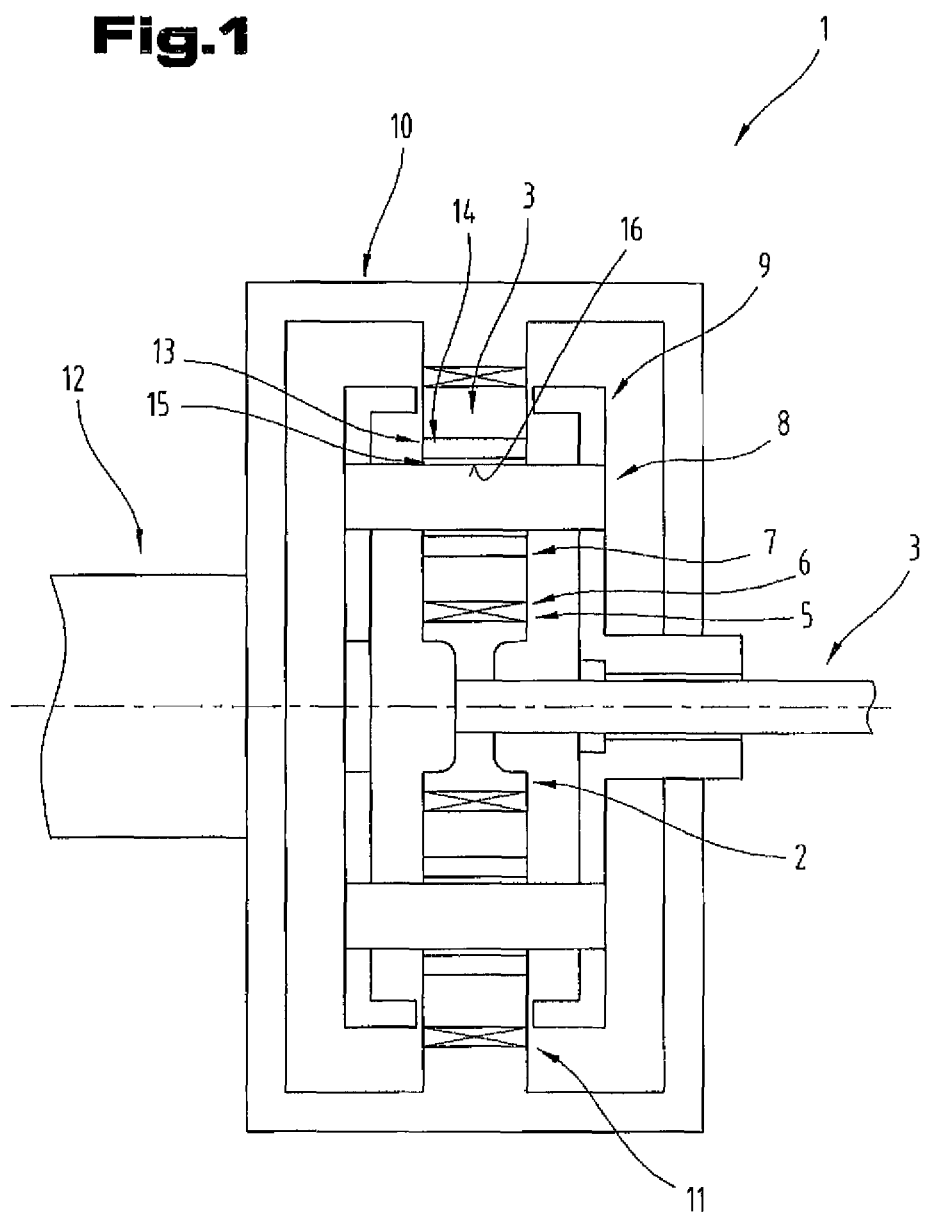
FIG. 1 shows a gear train in the form of a planetary gear in side view in cross section.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

FIG. 1 shows a gear train 1 in the form of a simple planetary gear for a wind turbine in side view in cross section.

As is generally known wind turbines comprise a tower with a gondola arranged at the upper end in which the rotor with the rotor blades is mounted. Said rotor is operatively connected via a gear train to a generator which is also located in the gondola, wherein by means of the gear train the low speed of the rotor is translated into a higher speed of the generator rotor. As such embodiments of wind turbines are found in the prior art reference is made at this point to the relevant literature.

The gear train 1 comprises a sun gear 2, which is connected non-rotatably to a shaft 3, which leads to the generator rotor. The sun gear 2 is surrounded by a plurality of planetary gears 3, for example two, preferably three or four. Both the sun gear 2 and the planetary gears 4 comprise spur toothings 5, 6, which are in meshing engagement with one another, whereby said spur toothings 5, 6 are indicated in FIG. 1 by a cross, The planetary gears 4 are mounted by means of multi-layered plain bearings 7 on a shaft 8 formed by a planet bolt, which supports the so-called planet shaft. Said shafts 8 can be configured either in one piece with at least one part of a planet carrier 9 or they are used as separate components in the bores of the planet carrier 9. Above the planetary gears 4 a ring gear 10 is arranged which on an inner surface also comprises at least partly a toothing 11, which is in meshing engagement with the spur toothing 6 of the planetary gears 4. The ring gear 10 is connected non-rotatably with a rotor shaft 12 of the rotor of the wind turbine. The spur toothings 5, 6 or the toothings 11 can be designed as spur toothing or oblique toothing.

As such planetary gear trains are also already known from the prior art, for example from the documents on the prior art cited above, further explanation is not necessary at this point. However, it should be noted that not only single stage embodiments of planetary gear are possible within the scope of the invention, but also multistage, for example two or three stage embodiments, where further spur gear stages can be integrated in at least one planet.

Furthermore, it should be noted that although preferred the invention is not only applicable for use in the planetary gears of wind turbines, but can be used generally in gear trains for wind turbines, in particular for translating the low speed of the rotor of a wind turbine into a higher speed.

The multi-layered plain bearings 7 can in principle be configured in the form of plain bearing half shells. Preferably, the latter are in the form of bearing bushes 13, i.e. planet bearing bushes. The bearing bush 13 of a planetary gear 4 is connected to the latter in a non-rotational manner, for example by means of a press-fit or another suitable method.

A multi-layered plain bearing 7 according to the invention consists of at least one support layer 14 and at least one antifrictional layer 15 which is applied onto the support layer. The antifrictional layer 15 thereby forms a running surface 16 for the shaft 8, i.e. the planet bolt.

The multi-layered configuration of the multi-layered plain bearing 7 can also be achieved in that the planet bolt is coated in the area of the bearing of the planetary gear 4 and/or the planetary gear 4 itself in the area of the bore mounting the planet bolt with a material for an anti-frictional layer. In this case, the support layer of the multi-layered plain bearing 7 is formed by the material of the planetary gear 4, for example steel and/or the material of the planet bolt, i.e. the shaft 8, for example steel.

In addition to this double-layered embodiment of the multi-layered plain bearing 7 it is also possible within the scope of the invention for intermediate layers to be arranged between the antifrictional layer 15 and the support layer 14, for example a bearing metal layer and/or at least one bonding layer and/or a diffusion barrier layer.

Examples of bearing metal layers are:

Bearing metals with an aluminum base, in particular:
AlSn6CuNi, AlSn20Cu, AlSi4Cd, AlCd3CuNi, AlSi11Cu, AlSn6Cu, AlSn40, AlSn25CuMn, AlSi11CuMgNi;

Bearing metals with a tin base, in particular: SnSb8Cu4, SnSb12Cu6Pb.

Other bearing metals can be also be used that are based on nickel, silver, iron or chromium alloys.

A bonding layer or a diffusion barrier layer can be formed for example by an aluminum layer, tin layer, copper layer, nickel layer, silver layer or alloys thereof, in particular binary alloys.

The support layer 14 itself is preferably made from a hard and homogenous basic bearing material, preferably selected from a group comprising CuZn alloys, for example CuZn31Si, CuSnZn, by an AlZn or a CuAl alloy, steel, wherein said alloys can comprise further elements such as Si, Mg, Mn, Ni, Zr, Ti, Fe, Cr, Mo in a total proportion of a maximum of 10 wt.%.

The antifrictional layer 15 preferably consists of a material selected from a group comprising alloys with a base of Al, AlZn, AlSi, AlSnSi, CuAl, CuSn, CuZn, CuSnZn, CuZnSn, CuBi, Bi, Ag, AlBi, antifrictional paints.

Examples of preferred alloys for the antifrictional layer are AlSn20Cu, AlZn4Si3, AlZnSi4,5. As the antifrictional paints for example it is possible to use polytetrafluoroethylene, fluorine-containing resins such as e.g. perfluoroalkoxy copolymers, polyfluoroalkoxy polytetrafluoroethylene copolymers, ethylene tetrafluoroethylene, polychlorotrifluoroethylene, fluorinated ethylene propylene copolymers, polyvinyl fluoride, polyvinylidene fluoride, alternating copolymers, static copolymers, such as e.g. perfluoroethylene propylene, polyesterimide, bismaleimide, polyimide resins, such as e.g. carboranimide, aromatic polyimide resins, hydrogen-free polyimide resins, poly-triazo-pyromellithimide, polyamide imides, in particular aromatic ones, polyaryl ether imide, possibly modified by isocyanates, polyether imide, possibly modified with isocyanates, epoxy resins, epoxy resins esters, phenolic resins, polyamide 6, polyamide 66, polyoxymethylene, silicones, polyaryl ether, polyaryl ketone, polyaryl ether ketone, polyaryl ether-ether ketone, polyetheretherketone, polyetherketones, polyvinylidene difluoride, polyethylene sulfide, allylene sulfide, poly-triazo-pyromellithimide, polyester imide, polyaryl sulfide, polyvinyl sulfide, polyphenyl sulfide, polysulfone, polyether sulfone, polyaryl sulfone, polyaryl oxide, polyaryl sulfide, as well as polymers thereof.

An antifrictional paint is preferred, which in a dry state consists of 40 wt. % to 45 wt. % MoS2, 20 wt. % to 25 wt. % graphite and 30 wt. % to 40 wt. % polyamide imide, wherein if necessary hard particles can also be included such as e.g. oxides, nitrides or carbides, in the antifrictional paint in a proportion of a maximum total of 20 wt. %, which replace a proportion of the solid lubricants.

Preferably, the antifrictional layer 15 has at least in the area of the running surface 16 a Vickers hardness of at least 75 HV (0.001) or between 25 HV (0.001) to 60 HV (0.001), if the antifrictional layer 15 is formed by an antifrictional paint. It is also possible that in the antifrictional layer 15 in the direction of the running surface 16 a hardness gradient is formed, in particular with an increasing hardness of the support layer 14 in the direction of the running surface 16.

It is also possible to have a polymer-based running-in layer on the antifrictional layer, such as for example an antifrictional paint which in a dry state consists of 40 wt. % to 45 wt. % MoS2, 20 wt. % to 25 wt. % graphite and 30 wt. % to 40 wt. % polyamide imide. Furthermore, it is possible to apply an additional hard layer onto the antifrictional layer, for example a so-called DLC layer, for example SiC, or C.

A preferred embodiment of the invention uses a lead-free Cu alloy as the support layer 14, in particular CuZn31Si, and as an antifrictional layer 15 AlSn20Cu.

Furthermore, in the preferred embodiment the antifrictional layer 15 is deposited according to a PVD method onto the support layer 14 or an intermediate layer, in particular according to a sputtering method.

It is also possible that the running surface 16 is deposited with a defined surface roughness, in order in particular in the running-in phase to provide a smaller bearing surface for the bearing counter surface on the running surface 16. In particular, said running surface 16 can have an arithmetical average roughness Ra according to DIN EN ISO 4287, selected from a range with a lower limit of 0.5 µm and an upper limit of 1.5 µm. With such a topography of the antifrictional layer 15 the formation of the lubricating gap is also improved.

Figure 2:
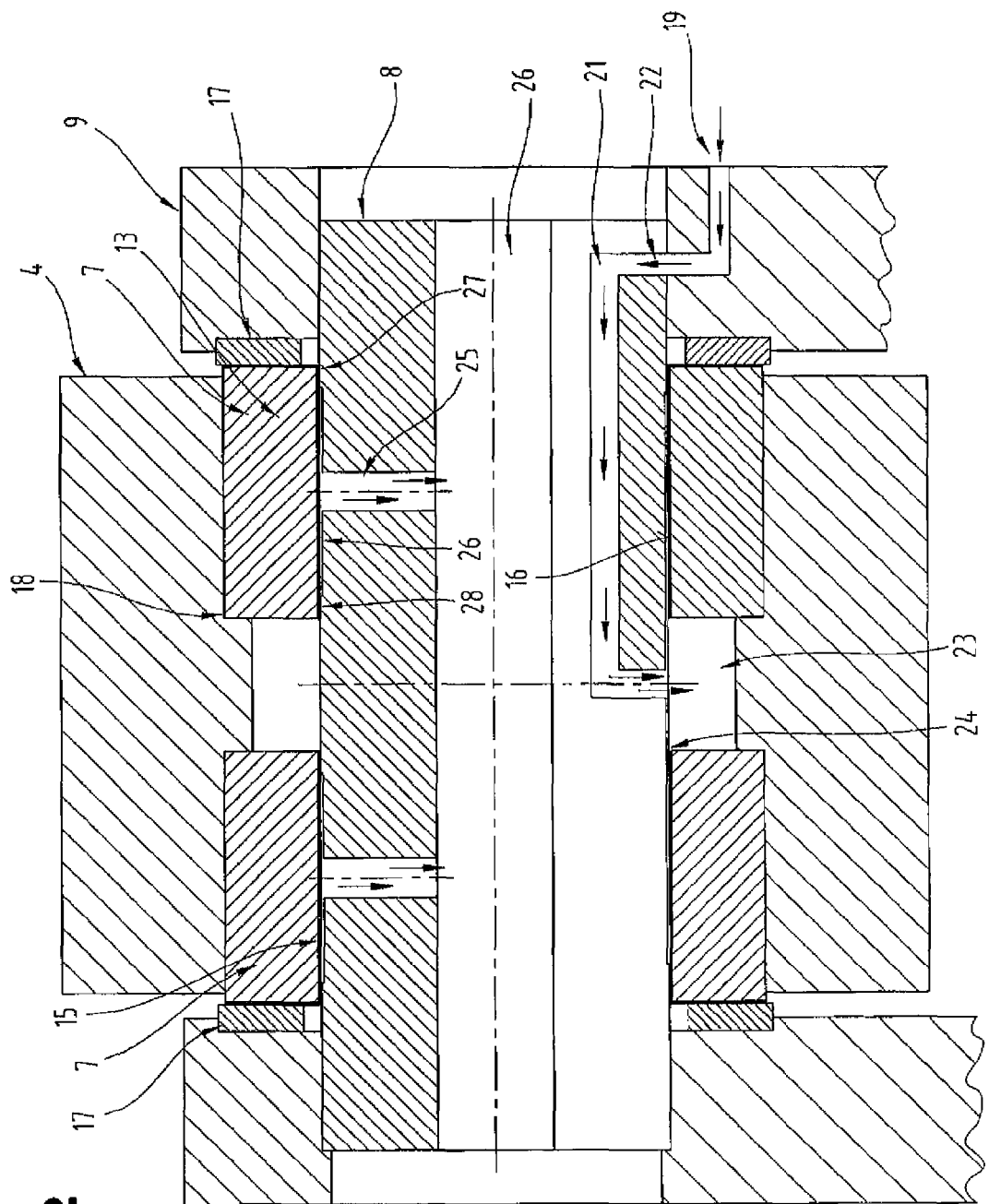
FIG. 2 shows a section of a planetary gear in the area of a planetary wheel.

FIG. 2 shows an embodiment variant of the invention, wherein in side view in cross section the area of a planetary gear 4 is shown. In this embodiment variant two multi-layered plain bearings 7 arranged spaced apart axially from one another are arranged, preferably as bearing bushes, between the planetary gear 4 and the shaft 8, that is the planet bolt. In the axial direction next to a multi-layered plain bearing 7 a run-in disc 17 is provided between the multi-layered plain bearing 7 and the planet carrier 9. The antifrictional layer 15 of the multi-layered plain bearing 7 is drawn up to the end face to the run-in disc 17 so that the multi-layered plain bearing 7 also performs an axial bearing function in addition to the radial bearing function. By means of a corresponding configuration of the multi-layered plain bearing 7 of the embodiment variant described above also axial guiding is possible even if no run-in discs are provided.

In addition, the planetary gear 4 comprises peripheral annular grooves 18 on the end sides—as seen in axial direction—in which the multi-layered plain bearings 7 are arranged.

FIG. 2 also shows an oil supply to the running surfaces 16 of the multi-layered plain bearing 7. In addition, by means of a bore 19 or channel-like recess in the planet carrier 9, which forms an oil inlet 20, which is connected to a not shown oil reservoir, oil is supplied to a channel 21 in the shaft 8 according to arrow 22 in an intermediate space 23 between the two multi-layered plain bearings 7, which space is also delimited by the planetary gear 4 and the shaft 8. The shaft 8, that is the planet bolt, can also have a recess 24 in the supply area of the oil, that is a step in the area of the surface, in order in this way to support the distribution of oil into the running surfaces 16 of the multi-layered plain bearing 7. However, it is also possible for the oil to be supplied solely via the shaft 8, i.e. the planet carrier 9 has no bore 19 or channel-like recess for this.

Alternatively it is of course possible that the oil supply is performed such that the channel 21 has oil outlets directly below the running surfaces 16 of the multi-layered plain bearing 7, so that the channel in the shown embodiment variant would end in two oil outlets in the region of the running surfaces 16 of the two multi-layered plain bearings 7.

For the removal of the lubricating oil on the side opposite the inlet, i.e. in the top part of the multi-layered plain bearing 7, in the planet bolt, i.e. the shaft 8, bores 25 or generally channel-like recesses are provided respectively underneath the multi-layered plain bearing 7, which end from the area of the running surface 16 beginning in an at least almost centrally arranged recess 26, in particular a center bore, of the planet bolt, i.e. the shaft 8, whereby by means of said center bore or the recess 26 the oil is returned back to the oil reservoir. The oil removal in the top part of the multi-layered plain bearing 7 also differs from the supply in that as a recess 27 in the surface of the planet bolt in the area below a multi-layered plain bearing 7 is configured as an annular groove, so that the multi-layered plain bearing 7 in this area bears in a position of rest via two lateral webs 27, 28 on the shaft 8.

In the embodiment of the gear train 1 according to the invention there are no oil pumps or the like for the supply of lubricating oil and for maintaining hydrostatic pressure. The oil is supplied in this purely hydrodynamic solution on the unloaded bearing side and by means of the rotational movement of the planetary gear 4 is drawn into the bearing itself, i.e. the multi-layered plain bearing 7. In the running-in phase of the gear trains 1 first of all mixed friction is created, but the damaging mixed friction is absorbed by the multi-layered structure of the multi-layered plain bearings 7. In this way inexpensive gear trains 1, in particular bearing elements, can be provided for planetary gears.

As in the embodiment of the gear train 1 according to the invention the latter operates without load equalization, a radial displacement of the multi-layered plain bearing 7 is possible so that also edge carriers can be formed. This is balanced or equalized by the hard antifrictional layer 15 and if necessary the running-in layer. It was observed during the testing of the gear train 1 that wear no longer occurs in a point-like manner but is distributed over the entire periphery of the multi-layered plain bearing 7, so that such wear does not lead to any significant or any functional impairment of the multi-layered plain bearing 7.

The exemplary embodiments show possible embodiment variants of the gear train 1 or the multi-layered plain bearing, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Finally, as a point of formality, it should be noted that for a better understanding of the structure of the gear train 1 or the multi-layered plain bearing 7 the latter and its components have not been represented true to scale in part and/or have been enlarged and/or reduced in size.

LIST OF REFERENCE NUMERALS

1 gear train
2 sun gear
3 shaft
4 planetary gear
5 spur toothing
6 spur toothing
7 multi-layered plain bearing
8 shaft
9 planet carrier
10 ring gear
11 toothing
12 rotor shaft
13 bearing bush
14 support layer
15 antifrictional layer
16 running surface
17 run-in disc
18 annular groove
19 bore
20 oil inlet
21 channel
22 arrow
23 intermediate space
24 recess
25 Bore
26 recess
27 web
28 web

The invention claimed is:

1. A planetary gear train for a wind turbine comprising a plurality of planetary gears, which are each supported on a shaft by a bearing element, wherein the bearing element is a multi-layered plain bearing operated only hydrodynamically without hydrostatic support, and wherein there are no oil pumps for supply of lubricating oil and for maintaining hydrostatic pressure, and wherein in a running-in phase of the planetary gear train, the lubricating oil is supplied on an unloaded bearing side and via rotational movement of the planetary gear is drawn into the multi-layered plain bearing.

2. The planetary gear train as claimed in claim 1, wherein the multi-layered plain bearing is configured as a bearing bush.

3. The planetary gear train as claimed in claim 1, wherein the multi-layered plain bearing comprises at least one support layer and at least one antifrictional layer wherein the antifrictional layer has a Vickers hardness of at least 75 HV(0.001) or between 25 HV (0.001) and 60 HV (0.001), if the latter is an antifrictional paint, at least in the surface area of a running surface.

4. The planetary gear train as claimed in claim 1, wherein an antifrictional layer is applied on at least one of an inner surface of the bore of the gearwheel mounting the shaft and an outer surface of the shaft, possibly with the provision of at least one intermediate layer, wherein the antifrictional layer has a Vickers hardness of at least 75 HV(0.001) or between 25 HV (0.001) and 60 HV (0.001), if the latter is an antifrictional paint, at least in the surface area of a running surface.

5. The planetary gear train as claimed in claim 3, wherein the antifrictional layer is made from a material or comprises a material, which is selected from a group comprising aluminum-based alloys, bismuth-based alloys, silver-based alloys and antifrictional paints.

6. The planetary gear train as claimed in claim 3, wherein a polymer-based running-in layer is applied onto the antifrictional layer.

7. The planetary gear train as claimed in claim 1, wherein in the shaft at least one member selected from the group consisting of a channel and a bore is arranged for supplying and removing lubricant for the bearing element.

8. The planetary gear train as claimed in claim 1, wherein the bearing element comprises at least two multi-layered plain bearings arranged spaced apart from one another axially.

9. A wind turbine comprising a rotor and a generator, wherein between the rotor and the generator a planetary gear train is arranged, which is in operative connection with the rotor and the generator, wherein the planetary gear train is configured according to claim 1.

* * * * *